US012577363B2

(12) United States Patent
Gorin et al.

(10) Patent No.: US 12,577,363 B2
(45) Date of Patent: Mar. 17, 2026

(54) PROCESS FOR REMOVAL OF CONTAMINANTS FROM CONTAMINATED THERMOPLASTIC

(71) Applicant: DOW GLOBAL TECHNOLOGIES LLC, Midland, MI (US)

(72) Inventors: Craig F. Gorin, Midland, MI (US); David L. Malotky, Midland, MI (US); Daniel L. Dermody, Midland, MI (US); Christopher J. Tucker, Midland, MI (US); Jin Wang, Midland, MI (US); Anurima Singh, Lake Jackson, TX (US); Jill M. Martin, Freeport, TX (US); Thomas Tomczak, Midland, MI (US); Hari Katepalli, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 585 days.

(21) Appl. No.: 18/016,087

(22) PCT Filed: Jul. 6, 2021

(86) PCT No.: PCT/US2021/040410
§ 371 (c)(1),
(2) Date: Jan. 13, 2023

(87) PCT Pub. No.: WO2022/015529
PCT Pub. Date: Jan. 20, 2022

(65) Prior Publication Data
US 2023/0272180 A1 Aug. 31, 2023

Related U.S. Application Data

(60) Provisional application No. 63/052,028, filed on Jul. 15, 2020.

(51) Int. Cl.
*C08J 11/06* (2006.01)
*B01D 11/02* (2006.01)
(Continued)

(52) U.S. Cl.
CPC ........... *C08J 11/06* (2013.01); *B01D 11/0226* (2013.01); *B01D 11/0288* (2013.01);
(Continued)

(58) Field of Classification Search
CPC ... C08J 11/02; C08J 11/06; C08J 11/14; C08J 3/03; C08J 3/16; B29B 17/02–021;
(Continued)

(56) References Cited

U.S. PATENT DOCUMENTS 3,422,049 A * 1/1969 Mcclain ..................... C08J 3/16
526/329
3,645,992 A 2/1972 Elston
(Continued)

FOREIGN PATENT DOCUMENTS

EP 0102122 A1 3/1984
EP 2789646 A1 10/2014
(Continued)

OTHER PUBLICATIONS

International Search Report for the corresponding International Application No. PCT/US2021/040410; International Filing Date: Jul. 6, 2021; Date of Mailing: Oct. 20, 2021; 6 pages.
(Continued)

*Primary Examiner* — Stephen E Rieth
(74) *Attorney, Agent, or Firm* — CANTOR COLBURN LLP

(57) ABSTRACT

A method for reducing an amount of a contaminant in a thermoplastic polymer comprising shearing a combination comprising a contaminated thermoplastic polymer in melt form, water, and a dispersing agent where the shearing
(Continued)

causes a portion of the contaminant to be removed from the contaminated thermoplastic polymer (e.g. moved into an aqueous phase with the water or into another separate phase from the water and the polymer), and after shearing, separating the thermoplastic from the aqueous phase to recover thermoplastic polymer.

14 Claims, 1 Drawing Sheet

(51) Int. Cl.
| | |
|---|---|
| *B29B 13/00* | (2006.01) |
| *B29B 13/02* | (2006.01) |
| *B29B 17/02* | (2006.01) |

(52) U.S. Cl.
CPC ............ *B29B 13/022* (2013.01); *B29B 17/02* (2013.01); *B29B 2013/002* (2013.01); *B29B 2017/0289* (2013.01); *C08J 2323/06* (2013.01)

(58) Field of Classification Search
CPC .. B20B 2017/0203–0296; B29C 48/29; B01D 11/02–0296; B01D 11/04–0496
See application file for complete search history.

(56) References Cited

U.S. PATENT DOCUMENTS

| | | | |
|---|---|---|---|
| 3,914,342 | A | 10/1975 | Mitchell |
| 4,076,698 | A | 2/1978 | Anderson et al. |
| 4,563,308 | A | 1/1986 | Plantema et al. |
| 4,599,392 | A | 7/1986 | Mckinney et al. |
| 4,602,046 | A | 7/1986 | Buser et al. |
| 4,746,422 | A | 5/1988 | Grimm |
| 5,125,824 | A | 6/1992 | Schaarschmidt |
| 5,272,236 | A | 12/1993 | Lai et al. |
| 5,278,272 | A | 1/1994 | Lai et al. |
| 5,330,581 | A | 7/1994 | Syrinek |
| 5,368,796 | A | 11/1994 | Lorenz et al. |
| 5,582,923 | A | 12/1996 | Kale et al. |
| 5,733,155 | A | 3/1998 | Sagawa |
| 5,767,230 | A | 6/1998 | Scarola et al. |
| 5,854,045 | A | 12/1998 | Fang et al. |
| 6,369,192 | B1 | 4/2002 | Dufresne et al. |
| 6,555,588 | B2 | 4/2003 | Gorski et al. |
| 7,462,685 | B2 | 12/2008 | Bohnert et al. |
| 7,763,676 | B2 | 7/2010 | Moncla et al. |
| 9,028,734 | B2 | 5/2015 | Hallaji |
| 9,695,259 | B2 | 7/2017 | Layman et al. |
| 9,803,035 | B2 | 10/2017 | Layman et al. |
| 9,808,963 | B2 | 11/2017 | Feichtinger et al. |
| 2003/0176564 | A1* | 9/2003 | Choudhery ........... B29C 48/022 524/503 |
| 2007/0228600 | A1 | 10/2007 | Bohnert et al. |
| 2010/0210789 | A1 | 8/2010 | Seidel et al. |
| 2014/0303268 | A1 | 10/2014 | Hearon |
| 2014/0377575 | A1 | 12/2014 | Langstaff et al. |
| 2015/0267028 | A1 | 9/2015 | Viot et al. |
| 2017/0002115 | A1 | 1/2017 | Layman et al. |
| 2019/0193303 | A1 | 6/2019 | Heyde et al. |
| 2019/0330439 | A1 | 10/2019 | Siegl et al. |
| 2020/0190306 | A1 | 6/2020 | Hara et al. |

FOREIGN PATENT DOCUMENTS

| | | |
|---|---|---|
| EP | 3674361 A1 | 7/2020 |
| EP | 4464739 A2 | 11/2024 |
| JP | H06285857 A | 10/1994 |
| WO | 2017062088 A1 | 4/2017 |
| WO | 2019039569 A1 | 2/2019 |
| WO | 2019083877 A1 | 5/2019 |
| WO | 2019182893 A1 | 9/2019 |
| WO | 2020043320 A1 | 3/2020 |
| WO | 2020058679 A1 | 3/2020 |

OTHER PUBLICATIONS

Second Written Opinion for the corresponding International Application No. PCT/US2021/040410; International Filing Date: Jul. 6, 2021; Date of Mailing: Dec. 17, 2021; 7 pages.

Written Opinion for the corresponding International Application No. PCT/US2021/040410; International Filing Date: Jul. 6, 2021; Date of Mailing: Oct. 20, 2021; 7 pages.

* cited by examiner

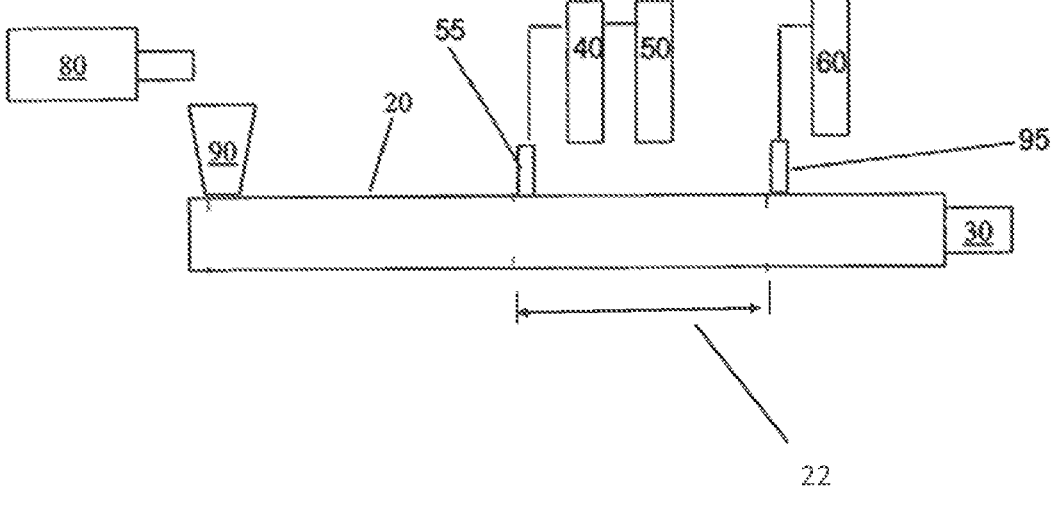

PROCESS FOR REMOVAL OF CONTAMINANTS FROM CONTAMINATED THERMOPLASTIC

CROSS-REFERENCE TO RELATED APPLICATIONS

This application is a National Stage application of PCT/US2021/040410, filed Jul. 6, 2021, which claims benefit of Provisional Application No. 63/052,028 filed on Jul. 15, 2020, both of which are incorporated by reference herein in their entirety.

FIELD OF THE INVENTION

The field of this invention is a method of removing contaminants from recycled polymers or other contaminated polymeric compositions.

BACKGROUND

Recycling of plastics is a common and valued practice. However, contaminants in and on the plastics being recycled can be problematic and can reduce the usefulness of such recycled materials.

Various approaches have been proposed for removing contaminants from plastic recycled materials.

Many of these processes involve use of organic solvents or halogenated hydrocarbons. For example, U.S. Pat. No. 4,746,422 discloses applying a two phase solution of halogenated hydrocarbon and water to the contaminated plastic and rotating the mixture is a separator. Using density differentials, the plastic in water is separated from the contaminant in the hydrocarbon. As another example, U.S. Pat. No. 5,368,796 uses mechanical stirring, surface cleaning and simultaneous extraction in a bath containing an organic solvent to remove foils, waxes and printing inks from foils made with polyethylene. Other systems also use solvent to remove contaminants located on ground up resin particles (See e.g. U.S. Pat. No. 7,462,685).

U.S. Pat. No. 6,555,588 describes a method to produce a polypropylene blend from a plastic mixture comprised of other polymers. This patent describes the extraction of polymer contaminants from a polymer at a temperature below the dissolution temperature of the polymer in the selected solvent, such as hexane, for a specified residence period. This patent further describes increasing the temperature of the solvent (or a second solvent) to dissolve the polymer prior to filtration. This patent yet further describes the use of shearing or flow to precipitate polypropylene from solution.

Other references also disclose solvent extraction methods—for example contacting a reclaimed polymer at elevated temperature (e.g. 80-220° C.) and pressure (e.g. 150 to 15000 pounds per square inch gauge (psig)) in a solvent having a boiling point of less than 70° C. to produce extracted reclaimed polymer which is then dissolved in the solvent or a second solvent and then separated from the solution. See e.g. U.S. Pat. Nos. 9,695,259, 9,803,035 and US2017/0002115. See also US2019/03330439.

U.S. Pat. No. 4,602,046 discloses using "high shear" in a solution containing chemical aids (e.g. caustic alkali with optional surfactant) in a tank to remove polymer from a multilayer article and comminute a polymer layer from scrap material such as photographic film having a polyester base and at least one layer of macromolecular organic polymer to recover "pure polyester".

Yet other approaches use surfactant and water or caustic and water at temperatures below the melt temperatures to clean plastic objects to remove glue and labels and the like. See e.g. U.S. Pat. No. 5,330,581.

U.S. 2019/0193303 discloses washing in low temperature, then washing at increased temperature in alkaline medium, sorting and treating at increased temperatures to remove migration materials.

Some have taught removing volatile organic content by de-volatilization extrusion or by hot air extraction. For example, U.S. Pat. No. 9,028,734 extrude flakes of polymer that have been washed and extruded into flat circular discs and that are then devolatilized in an upright cylindrical vessel with pellets moving downward and hot air flowing upward while the loosely confined pellets are stirred with paddles. See also U.S. Pat. No. 5,767,230 which process post-consumer recycle chips having volatile impurities in stirred bed with heated gas below melting point.

Yet other processes remove impurities using a fluid in supercritical state. See e.g. U.S. Pat. Nos. 4,563,308 and 6,369,192.

U.S. Pat. No. 9,808,963 melts then filters, homogenizes and degasses. Extruder can be used for melting. Shear can be used during homogenization. Water can be used as nucleating agent to promote degassing.

Despite these varied methods of processing post-consumer recycled polymers to remove contaminants, a need remains for an effective and simple process which can remove contaminants, including removal of multiple types of contaminants, while avoiding use of solvents, use of caustics, and/or complex or multi-step processes.

SUMMARY OF THE INVENTION

Disclosed herein is a method for reducing an amount of contaminant in a thermoplastic polymer comprising subjecting to shear (i.e. shearing) a combination comprising a contaminated thermoplastic polymer in melt form, water, and a dispersing agent and after shearing, separating the thermoplastic polymer from the water, dispersing agent, contaminants that were removed from the contaminated thermoplastic during shearing, and any other optional components to recover thermoplastic polymer having a reduced amount of contaminants.

BRIEF DESCRIPTION OF THE DRAWINGS

FIG. 1 is a schematic illustrating an apparatus for performing an embodiment of the method disclosed herein.

DETAILED DESCRIPTION OF THE INVENTION

Disclosed herein is a method of removing contaminants from a thermoplastic, such as a post-consumer recycled plastic (PCR). The method can be performed in a single unit operation (e.g. a single extruder) followed by collection of the purified thermoplastic. Alternatively, the method can be performed in multiple unit operations—e.g. two or more extruders in series with optional post extrusion processing. The method includes subjecting to shear, at a temperature above the melt temperature of the thermoplastic, a combination of the contaminated thermoplastic, water and a dispersing agent. During the shearing at least a portion of the contaminant(s) is(are) removed from the thermoplastic (e.g. PCR). The removed contaminants may then be found in an aqueous phase with the water or potentially in an alternate separate phase from the thermoplastic which phases are readily separable from the thermoplastic phase. By separating the resulting polymer from the aqueous phase and any potential third phase comprising the contaminant (e.g. by filtering), a purified thermoplastic polymer can be obtained that is useful for making other articles.

Description on the Contaminated Polymer

The contaminated polymer can be a post-consumer recycled plastic (PCRP) obtained from consumer products or containers, or industrial scrap. Sources of the contaminated polymer can include, for example, bottle caps and closures, milk, water or orange juice containers, detergent bottles, office automation equipment (printers, computers, copiers, etc.), white goods (refrigerators, washing machines, etc.), consumer electronics (televisions, video cassette recorders, stereos, etc.), automotive shredder residue (the mixed materials remaining after most of the metals have been sorted from shredded automobiles and other metal-rich products "shredded" by metal recyclers), packaging waste, household waste, rotomolded parts (kayaks/coolers), building waste and industrial molding and extrusion scrap. Examples of such contaminants include inorganic materials, adhesive materials, paper, oil residue, food residue, colorants, fillers, plasticizers and processing aids, decomposition products of the polymer, and combinations of two or more thereof. They may include solids, liquids, or volatile organic compounds.

The contaminated thermoplastic composition comprises at least 50 weight percent (i.e. weight % or wt %), or at least 60 weight percent, or at least 70 weight percent, or at least 75 weight percent, or at least 80 weight percent, or at least 85 weight percent, or at least 90 weight percent, or at least 95 weight percent, of a thermoplastic based on total weight of the contaminated thermoplastic composition. The contaminated thermoplastic composition can comprise up to 99.9 weight percent, or up to 99.5 weight percent, or up to 99 weight percent, or up to 98 weight percent, or up to 97 weight percent, or up to 96 weight percent, or up to 95 weight percent, or up to 90 weight percent, of a thermoplastic based on total weight of the composition.

The thermoplastic could be any thermoplastic such as a polyolefin, a styrenic polymer, an acrylic polymer, a polyamide, a thermoplastic urethane, or a thermoplastic silicone. Examples of polyolefins include ethylene polymers and copolymers, propylene polymers and copolymers. Particularly, the polyolefin can be a high density polyethylene (HDPE), a low density polyethylene (LDPE), a linear low density polyethylene (LLDPE), MDPE, ULDPE, a polypropylene (PP), copolymers of ethylene with another monomer, copolymers of propylene with another monomer, and the like.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm³.

The term "LLDPE", includes both resin made using the traditional Ziegler-Natta catalyst systems and chromium-based catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm³. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm³ and up to about 0.970 g/cm³, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm³, which are generally prepared with Ziegler-Natta catalysts, chrome catalysts, or single-site catalysts including, but not limited to, bis-metallocene catalysts and constrained geometry catalysts.

"Polypropylene" means polymers comprising greater than 50% by weight of units which have been derived from propylene monomer. This includes polypropylene homopolymers or copolymers (meaning units derived from two or more comonomers). Common forms of polypropylene known in the art include homopolymer polypropylene (hPP), random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof.

The amount of contaminants is at least 0.1 or at 0.5 or at least 1 or at least 2, or at least 3, or at least 4 weight percent or at least 5 weight percent or at least 10 weight percent and can be up to 50 weight percent or up to 40 weight percent or up to 30 weight percent or up to 25 weight percent or up to 20 weight percent or up to 15 weight percent or up to 10 weight percent, or up to 5 weight percent of total amount of contaminants based on total weight or the contaminated thermoplastic composition.

The contaminated thermoplastic can have a melt flow index according to ASTM 1238 at 190° C. with 2.16 kg force of at least 0.1, or at least 0.2, or at least 0.3, or at least 0.4, or at least 0.5 g/10 min up to 80, or up to 60, or up to 40, or up to 30, or up to 20, or up 10, or up to 5, or up to 2 g/10 min.

Removal of Contaminants from Contaminated Thermoplastic and Other Ingredients Used in the Removal The method includes combining the contaminated thermoplastic with water and a dispersing agent and subjecting the combination to shear at temperature above the melt temperature of the thermoplastic. The shearing can occur with the thermoplastic in melt form. The amount of shear should be sufficient to break the contaminated thermoplastic into small particles in the presence of the water and the dispersing agent. For example, the specific mechanical energy input into the mixture can be at least 0.01, or at least 0.05 or at least 0.08 kilowatt-hours/kilogram. The specific mechanical energy can be up to 0.5, or up to 0.4, or up to 0.3 kilowatt-hours/kilogram. For an extruder the specific mechanical energy can be calculated as {(rated power of the motor in kilowatts)×[(actual torque applied)/(maximum torque for the extruder)]×[(screw speed)/(maximum screw speed for the extruder)]×efficiency of the extruder system}/ [rate of material throughput in extruder (kg/h)]. The efficiency of the extruder system is the efficiency of transferring the motor energy into the melt. For example, certain energy losses may occur for example in gear boxes or other mechanical features.

The contaminated thermoplastic, water and dispersing agent are combined in amounts such that the amount of contaminated thermoplastic is at least 50, at least 55, at least 60, at least 65, at least 70, at least 75, or at least 80 weight percent up to 99.5, up to 98, up to 95 weight percent based on total weight of the contaminated thermoplastic, dispersing agent and any optional components (i.e. excluding water). Alternatively, the amount of. contaminated thermoplastic is at least 49.5, at least 50, at least 55, at least 50, at least 65, at least 70, at least 75, or at least 80 weight percent up to 97.5, up to 96, up to 95 weight percent based on total weight of the combination (i.e. the contaminated thermoplastic, water, dispersing agent and any optional components).

The amount of water in the combination is at least 2, or at least 4, or at least 5, or at least 10 weight percent up to 50, up to 40, up to 35 weight percent based on total weight of contaminated thermoplastic, water, dispersing agent and any optional components.

A dispersing agent (or combinations of more than one dispersing agent) is used in amounts of at least 0.5, or at least 1, or at least 2, or at least 3 weight percent up to 35, or up to 30, or up to 20, or up to 10 weight percent based on total weight of contaminated thermoplastic, dispersing agent and any optional components (i.e. weight of combination excluding water).

The dispersing agent can be those used in the art for polymer dispersions. For example, the dispersing agent can comprise at least one carboxylic acid, a salt of at least one carboxylic acid, or carboxylic acid ester or salt of the carboxylic acid ester. The carboxylic acid, the salt of the carboxylic acid, or the carboxylic acid portion of the carboxylic acid ester or the salt of such ester can have up to 60, or up to 50, or up to 40, or up to 30, or up to 25 carbon atoms. The carboxylic acid, the salt of the carboxylic acid, or the carboxylic acid portion of the carboxylic acid ester or the salt of such ester can have at least 12, at least or at least 15, or at least 20, or at least 25 carbon atoms. If in salt form, the dispersing agent comprise a cation selected from the group consisting of an alkali metal cation, alkaline earth metal cation, or ammonium or alkyl ammonium cation. The dispersing agent can be an olefin (e.g. ethylene) carboxylic acid polymer, or its salt, such as ethylene acrylic acid copolymers or ethylene methacrylic acid copolymers. Alternatively, the dispersing agent can be selected from alkyl ether carboxylates, petroleum sulfonates, sulfonated polyoxyethylenated alcohol, sulfated or phosphated polyoxyethylenated alcohols, polymeric ethylene oxide/propylene oxide dispersing agents, primary and secondary alcohol ethoxylates, alkyl glycosides and alkyl glycerides. Combinations of the above dispersing agents can be used.

A compatibilizer can be used in addition to the dispersing agent. For example, when non-ionic dispersing agents, such as the ethylene oxide/propylene oxide copolymers, are used an additional compatibilizer can be particularly desirable. A compatibilizer can also be used in combination with anionic or cationic dispersing agents.

The compatibilizer can improve compatibility between the dispersing agent and the thermoplastic. The compatibilizer can be, for example, an acid functionalized wax. The compatibilizer will generally have a lower amount of acid functionality than the dispersing agent—or stated alternatively, a higher acid equivalent weight. The compatibilizer can have an acid number of 10 to 70. "Acid number" is the number of milligrams of potassium hydroxide required for neutralization of the free acid present in one gram of the material (in this case the compatibilizer). The compatibilizer can have a melt index of 500 to 5,000,000 g/10 mi at 190° C. with 2.16 kg load. Non-limiting examples include acid-functional modified polyolefin wax, maleic anhydride polyolefin copolymer wax, maleic anhydride modified polyethylene wax, and maleic-anhydride modified polypropylene wax. A commercial example of a compatibilizer includes: LICOCENE™ 431 stabilized maleic anhydride grafted polyethylene wax (sometimes referred to as MA-g-PE), available from Clariant Corporation or its affiliates. The amount of the optional compatibilizer can be 0, or 0.5 wt % up to 15 or up to 10 wt % based on total weight of the contaminated thermoplastic, dispersing agent and compatibilizer and any other optional components (i.e. weight of combination excluding water).

Optionally, the combination of contaminated thermoplastic, water and dispersing agent can further include a cleaning agent that inhibits redeposition of contaminants on the thermoplastic and/or keeps such contaminants in the aqueous phase. The cleaning agent can wet and/or stabilize a contaminant, such as inorganic material, or organic contaminants such as acetic acid or limonene. Cleaning agents useful with inorganic contaminants can be, for example, ethoxylates, phosphates, carboxylates and polymeric materials with phosphates/carboxylate groups. Cleaning agents useful with smaller molecule organic compounds can be compounds known to assist in stabilization of such molecules in water phase. These cleaning agents could be anionic, non-ionic or cationic. Non-ionic cleaning agents include condensates of ethylene oxide with long chain fatty alcohols or fatty acids such as a C12-16 alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain (12-14C) alkyl ether, polyoxyalkylene sorbitan ethers, polyoxyalkylene alkoxylate esters, polyoxyalkylene alkylphenol ethers, ethylene glycol propylene glycol copolymers. Representative examples of suitable commercially available nonionic cleaning agents include polyoxyethylene fatty alcohols sold under the tradename BRIJ by Uniqema (ICI Surfactants), Wilmington, Del. Some examples are BRIJ 35 Liquid, an ethoxylated alcohol known as polyoxyethylene (23) lauryl ether, and BRIJ 30, another ethoxylated alcohol known as polyoxyethylene (4) lauryl ether. Some additional nonionic surfactants include ethoxylated alcohols sold under the trademark TERGITOL® by The Dow Chemical Company, Midland, Mich. Some example are TERGITOL® TMN-6, an ethoxylated alcohol known as ethoxylated trimethylnonanol; and various of the ethoxylated alcohols, i.e., C12-C14 secondary alcohol ethoxylates, sold under the trademarks TERGITOL® 15-S-5, TERGITOL® 15-S-12, TERGITOL® 15-S-15, and TERGITOL® 15-S-40. Other examples include nonyl phenol ethoxylates such as Tergitol® NP-30. A chelant for metal ions can be used. Examples of such chelants include ethylene diamine tetra-acetic acid (EDTA), ethylene diamine, aminotris(methylene phosphonic acid) or diethylenetriamine penta(methylene phosphonic acid).

The amount of cleaning agent can be from 0, or from 0.1, or from 0.5, or from 1 weight percent up to 10, or up to 7, or up to 5 weight percent based on total weight of the contaminated thermoplastic, dispersing agent and cleaning agent and any other optional components (i.e. weight of combination excluding water).

With certain dispersing agents or compatibilizers it can be desirable to include a neutralizer to improve the effectiveness of the dispersing agent. For example, a base, such as a metal hydroxide (e.g. KOH) can be added. The amount of neutralizing agent or base can be 60 to 120 percent based on cumulative acid number of the dispersing agent and any compatibilizer.

The contaminated thermoplastic and the aqueous solution are subjected to shear at a temperature above the melt temperature of the thermoplastic. Since the temperature is elevated, the pressure can also be elevated to keep the water and any other optional liquid additives in liquid form.

For example, the temperature can be from above the melt temperature up to 280° C. depending upon the polymer. The polymer should be maintained below temperature at which degradation of the thermoplastic may occur. The temperature can be at least 105, or at least 110, or at least 130, or at least 150, or at least 160° C. up to 280, or up to 250, or up to 240, or up to 230, or up to 220, or up to 210, or up to 200° C.

For example, the pressure can be at least 15, or at least 20, or at least 50, or at least 80, or at least 100, or at least 150, or at least 200 pounds per square in gauge up to 1000, or up 600, or up to 500, or up to 450, or up to 400, or up to 350 or up to 300 pounds per square inch gauge. Alternatively, the gauge pressure can be at least 100, or at least 150, or at least 200, or at least 500, or at least 1000 kilopascals (kPa) up to 7, or up to 4, or up to 3.5, or up to 3, or up to megaPascals (MPa).

The shearing of the combination of contaminated thermoplastic polymer, water, dispersing agent and any other optional ingredients at elevated temperature and pressure can occur in any device that can provide, shear, pressure control and temperature control. The device can be an extruder system. One example of such an extruder is as shown in FIG. 1.

An extruder, 20 can be coupled to a back pressure regulator, melt pump, or gear pump, 30.

The contaminated thermoplastic in the form of pellets, powder or flakes can be fed from the feeder 80 to an inlet 90 of the extruder 20. Additional solid ingredients, e.g. a solid dispersing agent, optional solid compatibilizer, can also be added at or near the inlet 90. These solid ingredients can be blended with the thermoplastic or added through a separate inlet (not shown). The resin is converted to a melt in the first portions of the extruder. Alternatively, a melt could be prepared separately (e.g. in a separate extruder) and fed into an extruder substantially simultaneously with the water, dispersing agent and any other ingredients. The resin melt (with any ingredients that have been added) can be then delivered to a shear and extraction zone 22 of the extruder. Additional ingredient(s) in liquid form can be added from one or more of the reservoirs 40 and 50 through one or more inlets (one shown) 55 via one or more pumps (not shown). While the inlet 55 is shown at the beginning of the shear and extraction zone, optionally, for example, a liquid dispersing agent can be added from a reservoir up-stream from the shear and extraction zone 22 at a portion of the extruder after the thermoplastic has become a melt. Such liquid ingredients can be a premixed combination of water, and one or more of dispersing agent, optional compatibilizer, optional cleaning agent, optional base, or such liquid ingredients (e.g., water, optional base, liquid dispersing agent, optional liquid compatibilizer, and/or optional cleaning agents can be provided from separate reserve vessels through separate pumps). Any suitable pump may be used. For example, a pump that provides a flow of about 150 cubic centimeters per minute (cc/min) at a pressure of 240 bar (24 megapascals (MPa)) can be used to provide the ingredients to the extruder 20. As another example, a liquid injection pump provides a flow of 300 cc/min at 200 bar (20 MPa) or 600 cc/min at 133 bar (13.3 MPa). The liquid ingredients can optionally be preheated in a preheater.

The temperature setting for the first portion of the extruder (or for a prior extruder feeding into the shear and extraction zone) can be sufficient to convert the contaminated thermoplastic into melt form. For example, the temperature can be at least 105, or at least 110, or at least 130, or at least 150, or at least 160° C. up to 280, up to 250, or up to 240, or up to 230, or up to 220, or up to 210, or up to 200° C. The temperature setting in the shear and extraction zone can be the same as in the first portion of the extruder or can be lower but still above the melt temperature. For a small scale extruder, the temperature can be substantially the same through the initial portion of the extruder and the shear/extraction zone 22. The temperature profile of the extruder system can include cooler zones for heating up at the beginning of the extruder and for cooling down after the shear and extraction zone 22. For example, one or more initial zones may be at a temperature of 25 to about 100° C., increasing in increments until reaching the desired melt and/or shear and extraction temperature. Similarly, optional cool down zone(s) may be from about 100 to 25° C. in increments as desired. The sheared mixture can be further diluted with additional water or other ingredients added via optional inlet 95 from optional reservoir 60 in an optional final zone after zone 22 of the extruder 20 for cooling and/or dilution.

Generally, to maintain pressure in the shear and extraction zone, there would be no venting from the extruder. However, in a system with two extruders in series—one to convert the contaminated thermoplastic to a melt and a second to shear the combination of the contaminated thermoplastic melt, water and dispersing agent (and optional components)—or in a long extruder system there could be venting in the portion of the system where the thermoplastic is being converted into a melt. In addition, in a long system, there could be venting toward the end of the final zone for cooling—e.g. to dewater the combination to some extent.

The thermoplastic polymer after shearing in combination with the water and dispersing agent can be collected and separated from the aqueous solution and removed contaminants. Methods for such collection and separation include allowing the material to float to the top and collection by skimming, a filtration process, a process where the material is strained to collect large contaminants and then agglomerated to collect in a filtration process, separated through centrifugal forces in either a continuous or batch manner, or separated in an extruder by diverting the water. The separated thermoplastic can be dried to form a powder or pelletized. The powder can be further sieved to remove contaminants of larger or smaller sizes.

The collected thermoplastic polymer can have a reduction in the amount of volatile organic species of at least 25, at least 50, or at least 60% based on amount of volatile organic species in the contaminated thermoplastic polymer that has not been processed as described herein. The collected thermoplastic polymer can have a reduction in the amount of solid contaminants or at least 30, at least 40, and least 50, at least 60% based on amount of solid contaminants in the contaminated thermoplastic polymer that has not been processed as described herein. The collected thermoplastic polymer can have a percent reduction in ash according to the method disclosed herein of at least 30, at least 40, and least 50, at least 60% based on amount of ash in contaminated thermoplastic polymer that has not been processed as described herein. The collected thermoplastic polymer can have an improvement in color as compared to the contaminated thermoplastic polymer that has not been processed as described herein. For example, using CIELAB color space defined by international commission on illumination, the purified thermoplastic polymer can have an increase in L* corresponding to the improved lightness or whiteness, and/or a reduction in the magnitude of a* and/or b* where a* corresponds to green (–) to red (+) and b* corresponds to blue (–) to yellow (+). For example, after processing the recovered thermoplastic can have an L* from 60 to 100, more preferably 80 to 100, most preferably 90 to 100 and/or an a* and/or b* from –10 to 10, more preferably –5 to 5, and most preferably –1 to 1.

The average particle size of the collected polymer can be from at least 0.1, at least 1, at least 5 or at least 10 microns. The average particle size can be up to 600, up to 400, up to 200, or up to 150 microns. The particle size can be measured by using standard particle size measurement instruments such as Beckman Coulter particle size analyzer.

EXAMPLES

Materials

Post-Consumer Recycle (PCR Material):
   Avangard™ 150 L/LLDPE pellets (melting point 108° C. by dynamic scanning calorimetry), density=0.9349 g/cc density, melt index=about 0.5 g/10 min MI)
   Talco™ HDPE Flakes (melting point 130° C., density=0.963 g/cc, melt index=0.8 g/10 min)
   KWR 101-150 HDPE Pellets (melting point 135° C., density=0.96 g/cc density, melt index=0.6 g/10 min, from KWR)
Dispersing Agent:
   Primacor™ 5980i (ethylene acrylic acid copolymer, 20 wt % comonomer, density=0.958 g/cc, melt flow index=300 g/10 min, melting point=77.2° C. from SK Global)
   Pluronic™ F-108 (ethylene oxide/propylene oxide copolymer, melting point of 60° C., number average molecular weight (Mn)=14,600, from BASF)
   Oleic acid 90 purity % (from Alfa Aesar)

Base:
   Potassium hydroxide (KOH) (30% in water, from Fisher Scientific)
   Dimethyl ethanol amine (DMEA)
Compatibilizer: Licocene™ 431 (MAH-grafted PE Wax, from Clariant)
Cleaning Agent:
   Tergitol™ NP-30 (from The Dow Chemical Company) cleaning agent
   Greasecutter Plus™ (from Ecolab) cleaning agent
Procedure and Equipment The runs are performed on a 12 zone 25 mm Berstorff twin screw extruder with zone 1 at 25° C., zone 2 at 90° C. and the remaining zones at 170° C. The post-consumer recycle polymer (PCR) is delivered to the system as a pellet or flake through a large Schenk feeder that dropped into the feed throat. Other solids e.g. Primacor 5980i, Pluronic F-108, and Licocene 431) are delivered as a pellet or powder using a K-tron feeder that also dropped into the feed throat. Oleic acid is added before zone 22 as a liquid after the polymer is in melt form. The Initial water and base are delivered through a single feed port via two separate pumps. Finally, the dilution water can be delivered via a large Hydracell pump through an injector further down the extruder.

The formulations run are shown in Table 1. Specific mechanical Energy is calculated as discussed herein. The estimated efficiency of 0.97 was used in the calculation.

Samples are collected from the end of the extruder and allowed to cool. The samples are collected in a bucket. For the large particle samples, they are vacuum filtered, dried in air for 24 hours and analyzed as is. For the samples labeled powder filtration method, the sample is placed into a bucket, allowed to float to the top, and vacuum filtered using a Buchner funnel. The powder is allowed to air dry overnight, then sieved through an 800 micron mesh filter bag. For examples labeled dispersion filter method, the dispersion is filtered through a 50 micron mesh filter bag, placed into a bucket, 0.1 wt % CaCl$_2$ is added, stirred, and the sample is allowed to float to the top after agglomeration. It was then vacuum filtered using a Buchner funnel, and allowed to air dry for 24 hours. Volatile organic content analysis for acetic acid and/or limonene is performed by collecting a 1 gram sample in a vial, heating to 190° C. and injecting into a Gas Chromatograph/Mass Spectrometer.

Particle size is done using a Beckman coulter particle size analyzer.

Color is determined by visual inspection on a scale of 1-5 where 1 is white or translucent, 3 is noticeably off-color, and 5 is dark brown or dark grey.

Ash is determined by thermogravimetric analysis. Approximately 10 mg sample is placed onto a pan and the weight is measured as the temperature is increased from 25 to 600° C. at a rate of 10° C./minutes in air. The weight percent of residue at the end of the run is reported as Ash %. Results are shown in Table 2.

TABLE 1

| Dispersion ID | PCR Resin | Rate feed of PCR (g/min) | Dispersing Agent | Rate feed of Dispersing Agent (g/min) | Rate feed of Compatibilizer (g/min) | Rate feed of cleaning agent* (g/min) | Rate feed of Base** (ml/min) | Water Rate to shear extraction zone (ml/min) | Dilution water rate after shear extraction zone (ml/min) | SME (kWh/kg) |
|---|---|---|---|---|---|---|---|---|---|---|
| 1 | Talco | 68.04 | Primacor 5980i | 3.78 | 3.78 | — | 2.36 | 23.39 | 90 | 0.18 |
| 2 | Talco | 64.26 | Primacor 5980i | 3.78 | 3.78 | 3.46 | 2.36 | 23.39 | 90 | 0.16 |

TABLE 1-continued

| Dispersion ID | PCR Resin | Rate feed of PCR (g/min) | Dispersing Agent | Rate feed of Dispersing Agent (g/min) | Rate feed of Compatibilizer (g/min) | Rate feed of cleaning agent* (g/min) | Rate feed of Base** (ml/min) | Water Rate to shear extraction zone (ml/min) | Dilution water rate after shear extraction zone (ml/min) | SME (kWh/kg) |
|---|---|---|---|---|---|---|---|---|---|---|
| 3 | KWR | 68.04 | Primacor 5980i | 7.56 | — | — | 3.05 | 22.5 | 90 | 0.21 |
| 4 | Avangard | 68.1 | Primacor 5980i | 7.56 | — | — | 3.66 | 22.41 | 90 | 0.20 |
| 5 | Avangard | 60.54 | Pluronic F-108 | 7.56 | 7.56 | — | 1.06 | 18.07 | 95 | 0.14 |
| 6 | Talco | 52.92 | Primacor 5980 | 22.68 | — | — | 14.63 | 25.1 | 83 | 0.17 |
| 7 | Talco | 52.16 | Primacor 5980i | 22.68 | — | 0.69 | 14.63 | 25.1 | 83 | 0.17 |
| 8* | Talco | 51.03 | Primacor 5980 | 20.79 | — | 3.78 | 13.41 | 25.98 | 83 | 0.18 |
| 9 | Talco | 56.75 | Pluronic F-108 | 11.35 | 7.56 | — | 2.66 | 6.14 | 100 | 0.15 |
| 10 | Talco | 67.3 | Oleic Acid | 3.38 | 5.29 | — | 3 | 1.35 | 111 | 0.17 |
| 11** | KWR | 56.75 | Pluronic F-108 | 11.35 | 7.56 | — | 0.69 | 3.33 | 137 | 0.17 |
| 12 | Avangard | 52.97 | Primacor 5980i | 22.7 | — | — | 10.98 | 24.39 | 86 | 0.17 |
| 13** | Avangard | 56.75 | Pluronic F-108 | 11.35 | 7.56 | — | 0.69 | 3.33 | 100 | 0.09 |

*Example 8 used Greasecutter Plus as cleaning agent. All others with cleaning agent used Tergitol NP-30
**Examples use 30% KOH in water except for examples 11 and 13 which use DMEA

TABLE 2

| | Dispersion Formulation | Particle Size μm | Volatiles* (ppm) | % reduction in volatiles | Color (1-5) | Ash (%) | % reduction in ash | Method filtered | Mass % Filtered |
|---|---|---|---|---|---|---|---|---|---|
| Control 1 | Unprocessed Talco Flakes | — | 64 | | 3 | 1.6 | | — | — |
| Ex 1 | ID 1 | >200 | 45 | 29 | 3 | 0.66 | 58 | | |
| Ex 2 | ID 2 | >200 | 10 | 85 | 3 | 0.53 | 66 | | |
| Ex3 | ID 9 | 8 | 22 | 65 | 1 | 0.29 | 82 | Powder | 4.5 |
| Ex4 | ID 6 | 150 | 20 | 69 | 1 | 0.24 | 85 | Powder | 5.2 |
| Ex5 | ID 7 | 150 | 2 | 97 | 1 | 0.24 | 85 | Powder | 5.1 |
| Ex6 | ID 8 | 150 | 10 | 84 | 1 | 0.24 | 85 | Powder | 5.2 |
| Ex7 | ID 10 | 13 | 23 | 64 | 2 | 0.16 | 90 | Dispersion | 2.9 |
| Control 2 | Unprocessed KWR Pellet | — | 43 | — | 3 | 0.25 | — | — | |
| Ex. 8 | ID 3 | >200 | 17 | 60 | 2 | 0.16 | 36 | | |
| Ex 9 | ID 11 | 66 | 8 | 81 | 1 | 0.14 | 44 | Powder | 1.3 |
| Comp 3 | Avangard Pellet | — | 8.6* | | 5 | 3.75 | | — | |
| Ex. 10 | ID 4 | >200 | <1* | >88 | 4 | 2.4 | 36 | | |
| Ex. 11 | ID 5 | >200 | <1* | >88 | 3 | 2 | 47 | | |
| Ex12 | ID 12 | 1.4 | <1 | >88 | 3 | 1.65 | 56 | Dispersion | 3.8 |
| Ex13 | 75/10/15 Av/Pluronic F-108/Licocene w/DMEA | 92 | <1 | >88 | 2 | 1.08 | 71 | Powder | 15.2 |

*Volatiles measured are limonene except for the Avangard samples measured acetic acid.

This disclosure further encompasses the following aspects.

Aspect 1: A method for reducing an amount of a contaminant in a thermoplastic polymer comprising subjecting to shear a combination comprising a contaminated thermoplastic polymer in melt form, water, and a dispersing agent; and, after shearing, separating the thermoplastic from the water, dispersing agent, contaminants that have been removed from the thermoplastic, and any optional components to recover the thermoplastic polymer. The recovered polymer will have a reduced amount of contaminants.

Aspect 2: The method of Aspect 1 wherein the combination comprises 49.5 to 97.5, of the contaminated thermoplastic polymer, and 2 to 50 preferably based on total weight of the combination.

Aspect 3: The method of Aspect 1 or 2 wherein the combination comprises 50-99.5 weight percent of the contaminated thermoplastic, 0.5-35, preferably 1 to 30, weight percent of the dispersing agent, 0 to 15, preferably 0.5 to 10, weight percent of a compatibilizer, 0 to 10, preferably 0.1 to 7, weight percent of a cleaning agent based on total weight of the contaminated thermoplastic, dispersing agent, compatibilizer, and cleaning agent. This weight percent does not include water.

Aspect 4: The method of any of the preceding Aspects wherein the shearing forms the thermoplastic polymer into particle sizes less than 200 microns.

Aspect 5: The method of any of the preceding Aspects wherein the thermoplastic polymer is a polyolefin.

Aspect 6: The method of any of the preceding Aspects wherein the pressure during shearing is sufficient to prevent volatilization of the water or the aqueous solution.

Aspect 7: The method of any of the preceding Aspects wherein the contaminated thermoplastic is a post-consumer recycled plastic.

Aspect 8: The method of any one of the preceding Aspects wherein the separating comprises filtration.

Aspect 9: The method of Aspect 8 wherein the separating comprises agglomeration prior to filtration.

Aspect 10: The method of any one of the preceding Aspects wherein the reduction in ash is at least 30%, preferably at least 50%, based on amount of ash in the contaminated thermoplastic polymer.

Aspect 11: The method of any one of the preceding Aspects wherein the reduction in volatiles is at least at least 25, preferably at least 50, and more preferably at least 60% based on amount of volatiles in the contaminated thermoplastic polymer.

Aspect 12: The method of any one of the preceding Aspects in a continuous process.

Aspect 13: The method of any one of the preceding Aspects wherein the shearing occurs in an extruder.

Aspect 14: The method of any one of the preceding Aspects wherein specific mechanical energy imparted during shearing is at least 0.01, preferably at least 0.05, and more preferably at least 0.08 kilowatt-hours/kilogram.

Aspect 15: The method of any one of the previous Aspects wherein shearing occurs at a temperature of 105 to 280° C., preferably 110 to 250, more preferably 150 to 220° C.

Aspect 16: The method of any one of the previous Aspects where shearing occurs at a gauge pressure of at least 100 kilopascals, preferably up to 4 megapascals.

Aspect 17: The method of any one of the previous Aspects wherein the recovered thermoplastic polymer is characterized by one or more of an L* from 60 to 100, more preferably 80 to 100, most preferably 90 to 100 and/or an a* and/or b* from −10 to 10, more preferably −5 to 5, and most preferably −1 to 1.

Aspect 18: The method of any one of the previous Aspects wherein the separating comprises one or more of allowing the material to float to the top and collection by skimming, filtering, straining is strained to collect large contaminants and then agglomerating to collect in a filtration process, centrifuging, or separating in an extruder by diverting the water.

Aspect 19: The method of any one of the previous Aspects wherein the separated thermoplastic is dried to form a powder.

Aspect 20: The method of Aspect 19 wherein the powder is sieved to remove additional contaminants.

Aspect 21: The method of any one of the previous Aspects wherein the separated thermoplastic is pelletized.

Aspect 22: The method of any one of the previous Aspects wherein the dispersing agent comprises at least one carboxylic acid, a salt of at least one carboxylic acid, or carboxylic acid ester or salt of the carboxylic acid ester.

Aspect 23: The method of any one of the previous Aspects wherein the dispersing agent comprises an ethylene oxide/propylene oxide copolymer.

Aspect 24: The method of any one of the previous Aspects wherein the dispersing agent comprises a carboxylic acid functional polymer or its salt.

Aspect 25: The method of any one of the previous Aspects the compatibilizer is an acid functionalized wax, preferably having an acid number of 10 to 70, preferably having a melt index of 500 to 5,000,000 g/10 mi at 190° C. with 2.16 kg load.

Aspect 26: The method of any one of the previous Aspects wherein the compatibilizer comprises acid-functional modified polyolefin wax, maleic anhydride polyolefin copolymer wax, maleic anhydride modified polyethylene wax, and/or maleic-anhydride modified polypropylene wax.

Aspect 27: The method of any one of the previous Aspects wherein the cleaning agent comprises ethoxylates, phosphates, carboxylates and polymeric materials with phosphates/carboxylate groups. condensates of ethylene oxide with long chain fatty alcohols or fatty acids such as a C12-16 alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain (12-14C) alkyl ether, polyoxyalkylene sorbitan ethers, polyoxyalkylene alkoxylate esters, polyoxyalkylene alkylphenol ethers, ethylene glycol propylene glycol copolymers, polyoxyethylene fatty alcohols, ethoxylated alcohols, ethylene diamine tetra-acetic acid (EDTA), ethylene diamine, aminotris(methylene phosphonic acid) and/or or diethylenetriamine penta(methylene phosphonic acid).

Aspect 28: The method of anyone of the previous aspects where the base is potassium hydroxide or dimethyl ethanol amine.

Aspect 29: The method of any one of the previous Aspects where solid ingredients are fed into a first portion of the extruder.

Aspect 30: The method of any one of the previous Aspects where liquid ingredients are fed to the extruder at or before the shear and extraction zone but after the thermoplastic is in melt form.

Aspect 31: The method of any one of the previous Aspects where a neutralizing agent (e.g. base) is added to the combination, preferably in an amount of 60 to 120 percent of the combined acid number of the dispersing agent and the compatibilizer.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). Moreover, stated upper and lower limits can be combined to form ranges (e.g. "at least 1 or at least 2 weight percent" and "up to 10 or 5 weight percent" can be combined as the ranges "1 to 10 weight percent", or "1 to 5 weight percent" or "2 to 10 weight percent" or "2 to 5 weight percent").

Unless specified to the contrary herein, all test standards are the most recent standard in effect as of the filing date of this application, or, if priority is claimed, the filing date of the earliest priority application in which the test standard appears.

What is claimed is:

1. A method for reducing an amount of a contaminant in a thermoplastic polymer comprising shearing a combination comprising a contaminated thermoplastic polymer in melt form, water, and a dispersing agent, after shearing, separating the thermoplastic polymer from the water and from contaminants that were removed from the contaminated thermoplastic polymer to recover thermoplastic polymer, wherein the contaminated thermoplastic polymer is a post-consumer recycled polymer and wherein the recovered thermoplastic polymer yields a reduction in ash of at least 30% relative to a yield of ash from the contaminated thermoplastic polymer wherein amount of ash is determined by thermogravimetric analysis.

2. The method of claim 1 wherein the combination comprises 49.5 to 97.5 weight percent of the contaminated thermoplastic polymer and 2 to 50 weight percent water based on total weight of the combination.

3. The method of claim 1 wherein the combination comprises 0.5 to 35 weight percent of the dispersing agent, 0 to 15 weight percent of a compatibilizer and 0 to 10 weight percent a cleaning agent based on total weight of the combination excluding the weight of the water.

4. The method of claim 3 wherein a neutralizing agent is added in an amount of 60 to 120 percent of the combined acid number of the dispersing agent and the compatibilizer.

5. The method of claim 1 wherein the shearing forms the thermoplastic polymer into particle sizes less than 200 microns.

6. The method of claim 1 wherein the thermoplastic polymer is a polyolefin.

7. The method of claim 1 wherein the pressure during shearing is sufficient to prevent volatilization of the water.

8. The method of claim 1 wherein the separating comprises filtration and, optionally, agglomeration prior to filtration.

9. The method of claim 1 wherein the reduction in volatiles is at least 25% based on amount of volatiles in the contaminated thermoplastic polymer.

10. The method of claim 1 wherein the shearing occurs in an extruder.

11. The method of claim 1 wherein specific mechanical energy imparted during shearing is at least 0.01 kilowatt-hours/kilogram.

12. The method of claim 1 wherein shearing occurs at a temperature of 105 to 280° C.

13. The method of claim 1 where shearing occurs at a gauge pressure of at least 100 kilopascals.

14. The method of claim 1 wherein the contaminants comprise inorganic materials, adhesive materials, paper, oil residue, food residue, colorants, fillers, plasticizers, processing aids, decomposition products of the polymer, or combinations of two or more thereof.

\* \* \* \* \*